US012574214B2

(12) United States Patent　　(10) Patent No.:　US 12,574,214 B2

Crawshaw　　(45) Date of Patent:　Mar. 10, 2026

(54) DISTRIBUTION AND USE OF ENCRYPTION KEYS TO DIRECT COMMUNICATIONS

(71) Applicant: Tailscale Inc., Toronto (CA)

(72) Inventor: David J. Crawshaw, Berkeley, CA (US)

(73) Assignee: Tailscale Inc., Toronto (CA)

( * ) Notice:　Subject to any disclaimer, the term of this patent is extended or adjusted under 35 U.S.C. 154(b) by 433 days.

(21) Appl. No.: 17/876,406

(22) Filed:　Jul. 28, 2022

(65)　Prior Publication Data

US 2024/0039702 A1　Feb. 1, 2024

(51) Int. Cl.
　*H04L 9/08*　　　(2006.01)
　*H04L 9/32*　　　(2006.01)
　*H04L 9/40*　　　(2022.01)

(52) U.S. Cl.
　CPC ........ *H04L 9/0822* (2013.01); *H04L 63/0428* (2013.01); *H04L 63/065* (2013.01)

(58) Field of Classification Search
　CPC .. H04L 9/0822; H04L 63/0428; H04L 63/065
　USPC ........................................ 713/171
　See application file for complete search history.

(56)　References Cited

U.S. PATENT DOCUMENTS

| | | | | |
|---|---|---|---|---|
| 8,745,755 B2 * | 6/2014 | Borzycki | ............ | G06F 21/6218 |
| | | | | 380/255 |
| 9,419,951 B1 * | 8/2016 | Felsher | ................. | H04L 9/3249 |

| | | | | |
|---|---|---|---|---|
| 9,980,140 B1 * | 5/2018 | Spencer | ................ | H04W 12/02 |
| 10,872,333 B2 * | 12/2020 | Dua | ...................... | G06Q 20/322 |
| 11,832,100 B2 * | 11/2023 | Sanciangco | ............. | H04L 63/06 |
| 12,019,562 B2 * | 6/2024 | LeMay | ............... | G06F 12/0831 |
| 2011/0296186 A1 * | 12/2011 | Wong | ................... | H04L 63/0428 |
| | | | | 713/171 |
| 2013/0227286 A1 * | 8/2013 | Brisson | ................. | H04L 63/062 |
| | | | | 713/168 |
| 2017/0126638 A1 * | 5/2017 | Ye | ........................ | H04L 63/0471 |
| 2018/0198754 A1 * | 7/2018 | Kielhofner | .............. | H04L 45/50 |
| 2021/0266346 A1 * | 8/2021 | Gordon | ............... | H04L 63/0245 |
| 2022/0361269 A1 * | 11/2022 | Ficara | ................... | H04W 12/02 |

FOREIGN PATENT DOCUMENTS

| | | | | |
|---|---|---|---|---|
| JP | 2008288757 | * | 11/2008 | |
| WO | WO-2021032304 | * | 2/2021 | |
| WO | WO-2021032304 A1 * | 2/2021 | ......... | H04L 63/0272 |

OTHER PUBLICATIONS

Weichao Wang; Key Distribution and Update for Secure Inter-group Multicast Communication; ACM; 2005; pp. 43-52.*

* cited by examiner

*Primary Examiner* — Monjur Rahim

(57)　　ABSTRACT

Described herein are systems, methods, and software to direct communications for a private network using advertised encryption key information. In one implementation, a first computing element identifies an encrypted communication from a second computing element and identifies a destination computing element from a plurality of destination computing elements based on an application of encryption keys to the encrypted communication. The first computing element further forwards the encrypted communication to the destination computing element.

20 Claims, 7 Drawing Sheets

200

201
IDENTIFY AN ENCRYPTED COMMUNICATION FROM A SECOND COMPUTING ELEMENT

202
IDENTIFY A DESTINATION COMPUTING ELEMENT FROM A PLURALITY OF COMPUTING ELEMENTS FOR THE ENCRYPTED COMMUNICATION BASED ON A PUBLIC ENCRYPTION KEY IN A HEADER OF THE ENCRYPTED COMMUNICATION

203
FORWARD THE ENCRYPTED COMMUNICATION TO THE DESTINATION COMPUTING ELEMENT

DISTRIBUTION AND USE OF ENCRYPTION KEYS TO DIRECT COMMUNICATIONS

TECHNICAL BACKGROUND

In computing networks, physical and virtual computing systems can include applications and services that require communications with other computing systems to provide desired operations. For example, an application on a first computing system may require data from a storage server located on a second computing system. To provide the communication, the data payload may be placed in a network packet and transferred to the required computing system. However, although network packets provide a method of communication between computing systems, difficulties often arise in maintaining security and configuration information to support the communications.

To overcome some of the deficiencies presented in securing network communications, various technologies have been developed. These technologies include virtual local area networks (VLANs), encryption for the data payload within the data packets, amongst other similar security procedures. Yet, while these security technologies may provide additional security over unprotected network packets, configuring individual networks can be difficult and cumbersome. These difficulties are compounded when a network includes different types of computing systems with different firewall and other security measures. Additionally, difficulties can arise when intermediary or relay computing systems are required to provide the desired connections from a first computing system to a second computing system

SUMMARY

The technology described herein manages private network communications using distributed encryption keys for addressing packets. In one implementation, a method of operating a first computing element comprises identifying an encrypted communication from a second computing element. The method further provides identifying a destination computing element from a plurality of destination computing elements for the encrypted communication based on a public encryption key in the header of the encrypted communication. The method also includes forwarding the encrypted communication to the destination computing element.

In at least one example, the public encryption key in the header can be compared to a list of public encryption keys to identify the destination computing element, wherein each of the public encryption keys can be advertised by a possible destination computing element.

DETAILED DESCRIPTION

Figure 1:
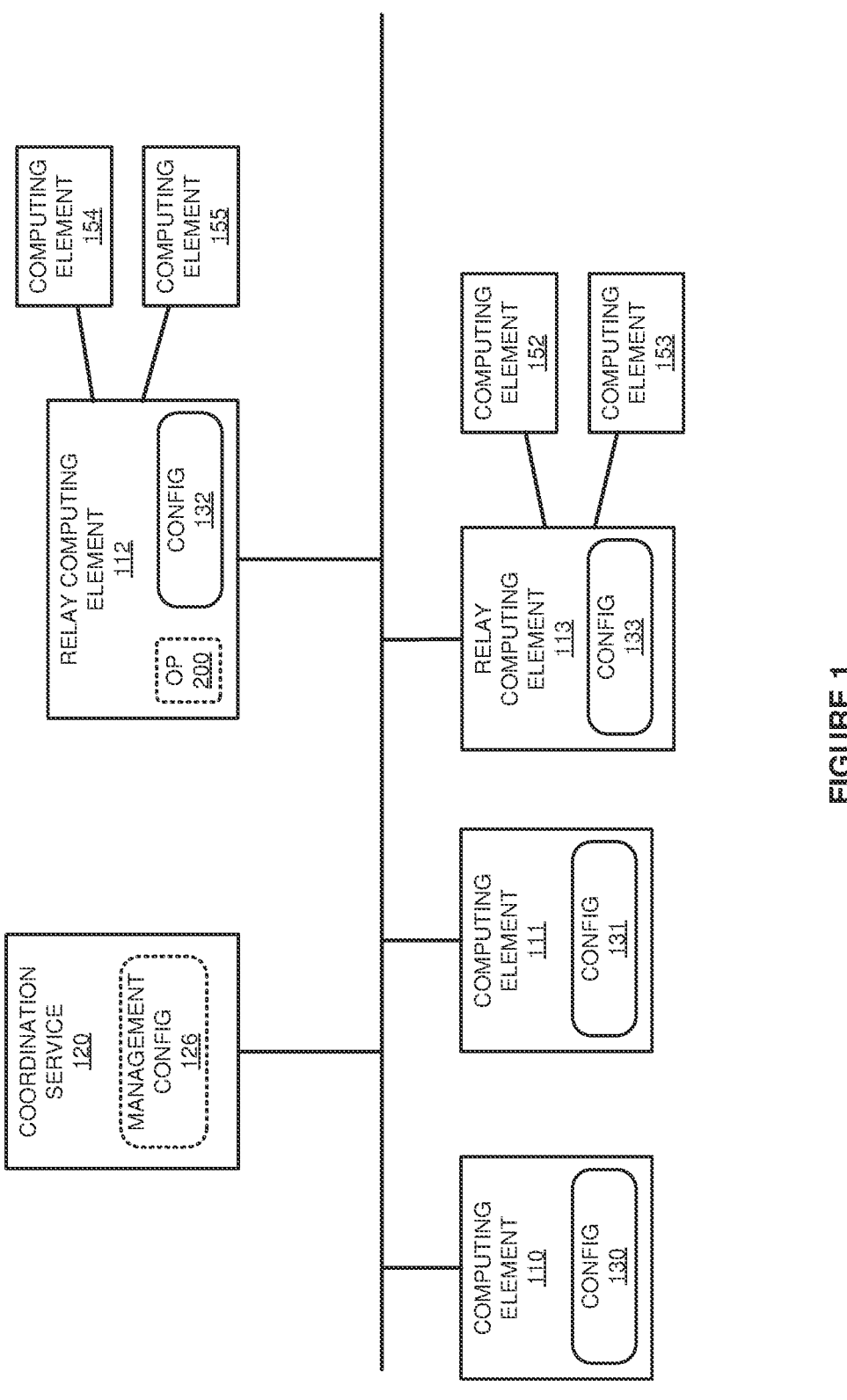
FIG. 1 illustrates a computing environment to use encryption keys in advertising computing elements according to an implementation.

FIG. 1 illustrates a computing environment 100 to use encryption keys in advertising computing elements according to an implementation. Computing environment 100 includes coordination service 120, and computing elements 110-113 and 152-155. Coordination service 120 further includes management configuration 126 and provides operation 200 that is further described below in FIG. 2. Computing elements 110-113 further include configurations 130-133 and computing element 110 further provides operation 300 that is described below in FIG. 3. Computing elements 110-113 and coordination service 120 communicate via a network, such as the internet. Computing elements 112-113 may also represent relay computing nodes that can be used to support communications (i.e., communication of packets) for computing elements 152-155.

In computing environment 100, computing elements 110-113 and 152-155 may represent computing elements in a private network, wherein the private network may be used to securely communicate packets between computing elements in the network. Computing elements 110-113 and 152-155 may represent physical computing systems or virtualized endpoints, including virtual machines or containers. To support the private network, coordination service 120 is included that can be used to coordinate or configure the computing elements to communicate. When a new computing element requires to join the private network, the computing element may generate a request to coordination service 120, wherein the request may indicate information about the registering computing element. The information may include credentials associated with the computing element (e.g., username, password, and the like), an IP address associated with the computing element, public encryption key information generated by the computing element, or some other information.

Once the information is received by coordination service 120, coordination service 120 may use management configuration 126 to determine whether the computing element is permitted to join the network and distribute communication information to the computing elements in the private network. In some implementations, management configuration 126 may provide information about the users and/or computing elements that are permitted to join the network. As an example, computing element 110 may generate a request to join a private network and provide information about the computing element to coordination service 120. Coordination service may determine whether the computing element is permitted to join the network and distribute communication information to computing element 110 and other computing elements associated with the private network, permitting communications to and from the computing element 110. The communication information may include IP address information, encryption key information, communication limitations (e.g., ports, protocols, and the like) or some other communication information. The communication information may be derived from the information supplied by computing element 110, information supplied by the other computing elements in the private network, and the information maintained as part of management configuration 126. Once the communication information is distributed, computing element 110 may be permitted to communicate in the private network.

In at least one example, the communication information provided to computing element 110 may include private IP addresses for other computing elements in the network (e.g., addresses allocated by coordination service 120 for the computing elements), public IP addresses provided by the computing elements, encryption key information for each of the computing elements, or some other communication information. When computing element 110 requires a communication with computing element 111 using the private network, the process or application on computing element 110 may use the private IP address allocated to computing element 111. A private network service, executing on computing element 110 may identify the communication (i.e., packet) and encapsulate the packet using the public addressing information associated with computing elements 110-111, wherein the public addressing information may include at least a public IP address for computing element 111. Once encapsulated (and encrypted), the encapsulated packet is forwarded to computing element 111, wherein computing element 111 may decapsulate the packet using a private encryption key and forward the decapsulated packet to the corresponding process on computing element 111.

In some implementations, one or more computing elements may use a relay computing element, such as computing elements 112-113. The relay computing element may be used to bypass firewalls or overcome other communication obstacles in providing the communications for a private network. For example, computing element 154 may use relay computing element 112 as an intermediary to communicate with at least computing elements 110-111. To support the communications, coordination service 120 may distribute public encryption key information to other computing elements in the private network and may indicate that the public encryption key should be associated with the public IP address for relay computing element 112. When a packet is to be communicated to a computing system behind the relay, the computing system may direct the packet to the relay computing element but encrypt the payload using the public encryption key from the destination computing element. For example, when computing element 110 attempts to communicate with computing element 154 and the computing elements are on the same private network, computing element 110 may encrypt and encapsulate the packet using the public key provided for computing element 154. Additionally, the outer or encapsulation header for the packet may include the IP address for relay computing element 112 and the public encryption key itself.

After encapsulating the packet, the encapsulated packet is communicated to relay computing element 112 that will determine a destination computing element of computing elements 154-155 based on the public encryption key included in the encryption header of the packet. In some implementations, each computing element 154-155 may advertise the public encryption key to relay computing element 112. The advertising may comprise a direct advertisement of the public key by computing elements 154-155, may comprise coordination service 120 supplying the public key to relay computing element 112, or may comprise some other advertisement of the public keys to relay computing element 112. In some implementations, the public encryption key is signed by the advertising computing element, such that the relay computing element can verify that the advertising computing element is the proper destination for communications with the public encryption key. The signing may include applying the private encryption key to the public encryption key. As an example, computing element 154 may advertise its public encryption key to relay computing element 112 by encrypting the public encryption key using its own private encryption key. Relay computing element 112 may maintain configuration 132 that associates the provided public encryption key for computing element 154 with an IP address for computing element 154, such that communications that include the corresponding public encryption key can be forwarded to computing element 154.

Once the destination is determined for a received communication using the public encryption key, the packet is forwarded toward the destination computing element, which in this example comprises computing element 154. In some implementations, relay computing element 112 may perform address translation on the received encapsulated packet, wherein the packet is received from computing element 110 using a destination IP address for relay computing element 112 and is translated into the public IP address for computing element 154. In some examples, relay computing element 112 may maintain at least one data structure as part of configuration 132 to indicate the association between a public destination IP address and the corresponding public key. Thus, packets received with encryption using a first public key may be forwarded to computing element 154, while packets received with encryption using a second public key may be forwarded to computing element 155.

By using a relay computing system, the transmitting computing element is not required to identify or receive the public IP address associated with the destination computing element. Instead, the transmitting computing element may receive IP address information associated with the relay and a public key associated with the destination computing element. The relay computing system may then be responsible for identifying the required destination for an encapsulated packet based on the included public encryption key in comparison to advertised public encryption keys from the available destination computing elements. The advertised keys may include public keys from computing elements 110-112, 152-155, or other relay computing elements if the relay computing elements can be a destination for a communication.

Figure 2:
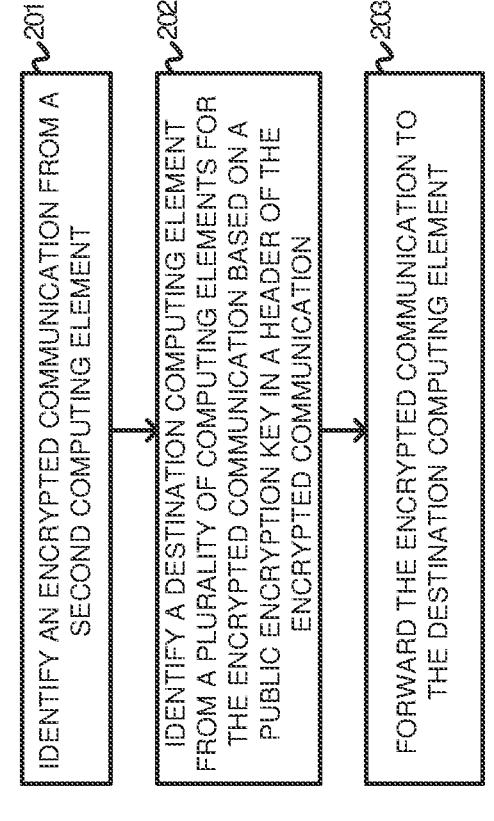
FIG. 2 illustrates an operation of a computing element to manage communications using encryption keys according to an implementation.

FIG. 2 illustrates an operation 200 of a computing element to manage communications using encryption keys according to an implementation. The steps of operation 200 are referenced parenthetically in the paragraphs that follow with reference to systems and elements of computing environment 100 of FIG. 1. Although demonstrated using relay computing element 112, a computing environment may employ multiple relay computing elements in some examples.

To implement operation 200, relay computing element 112 may maintain configuration 132 that can direct communications received from computing elements to one of computing element 154-155. Configuration 132 may associate public keys used for encrypting packets directed to at least computing elements 154-155 with public IP addresses for computing elements 154-155. Configuration 132 may use information provided directly from computing elements 154-155 or may use information from coordination service 120. In some implementations, coordination service 120 may distribute communication information to computing elements to support the communications for the private network. The communication information may include public IP addressing information, private IP addressing information allocated by coordination service, encryption key information, or some other information. When a computing system joins the private network and uses a relay computing node to support the communication, the public IP address will not be shared with the other computing elements. Instead, the public IP address for the relay computing element may be distributed as a destination address for computing elements 154-155.

For example, computing element 154 may request to join a private network, wherein the communications in the private network may require a relay for computing element 154. Relays may be required due to firewall requirements associated with the computing element, location of the computing element, an administrator configuration for the private network, or some other factor. In some examples, coordination service 120 may select a relay computing element from a set of available computing elements, wherein the relay can be selected out of latency, resources available, or some other selection criteria. Once selected, communication information associated with computing element 154 can be distributed to other computing elements in the private network, while computing element 154 receives communication information about other computing elements in the private network. This permits computing element 154 to initiate and receive communications from other permitted computing elements. Using the previous example, computing element 154 may use relay computing element 112 to support the communications with other computing elements in the private network. For example, computing element 154 may use relay computing element 112 to communicate with computing elements 110-111.

After configuring for the relay communications, relay computing element 112 receives and identifies (201) an encrypted communication from a second computing element. In some implementations, other computing elements in the private network can be distributed public encryption key information associated with computing elements that use relay computing element 112. The other computing elements may also be provided with a public IP address for relay computing element 112, wherein relay computing element 112 can act as an intermediary to limit the exposure of the public IP address associated with computing element 154. After identifying the encrypted communication, operation 200 further identifies (202) a destination computing element from a plurality of destination computing elements for the encrypted communication based on a public encryption key in a header of the encrypted communications. Once identified, operation 200 forwards (203) the encrypted communication to the destination computing element.

In some implementations, computing element 112 may maintain at least one data structure that associates destination public IP addresses for computing systems using the relay with public encryption keys that can be used to sign or verify the destination of a particular encrypted packet. In some implementations, the available destination computing elements may advertise their public encryption key directly to computing element 112 using a tunnel between the systems or by signing the public key using the private key. In other implementations, computing element 112 may provide the public key to coordination service 120, permitting coordination service 120 to distribute the public key information to one or more computing elements in the computing environment. Advantageously, in the current implementation, rather than providing the public IP address for each device to other computing systems in the private network, the computing elements may be provided with relay IP addresses and public encryption keys that can be used to direct packets from a corresponding relay to a destination computing element. The public key may also be included in the header of the communication, permitting relay computing element 112 to compare the public key to the database to identify a corresponding destination IP address.

In some examples, when relay computing element 112 identifies a destination computing element, relay computing element 112 may perform network address translation on the packet, wherein the translation may replace at least the destination IP address that corresponds to the relay with the destination IP address that corresponds to the destination computing element. Once translated, the packet with the translated IP address can be forwarded to the destination computing element.

Although demonstrated as a communication (i.e., packet) being delivered to computing element of computing elements 154-155, relay computing element 112 may also be used to direct traffic to another computing in a private network. Specifically, relay computing element 112 may receive a communication from a computing element, such as computing element 154, and identify a destination for the communication based on the public encryption key included in the header of the communication. For example, computing element 154 may generate a packet with a destination IP address for relay computing element 112 and encrypt the packet using a public key associated with computing element 110. In response to receiving the communication, relay computing element may identify computing element 110 as the destination based on the public encryption key for computing element 110 being included in the header of the communication and forward the communication to the desired destination.

Figure 3:
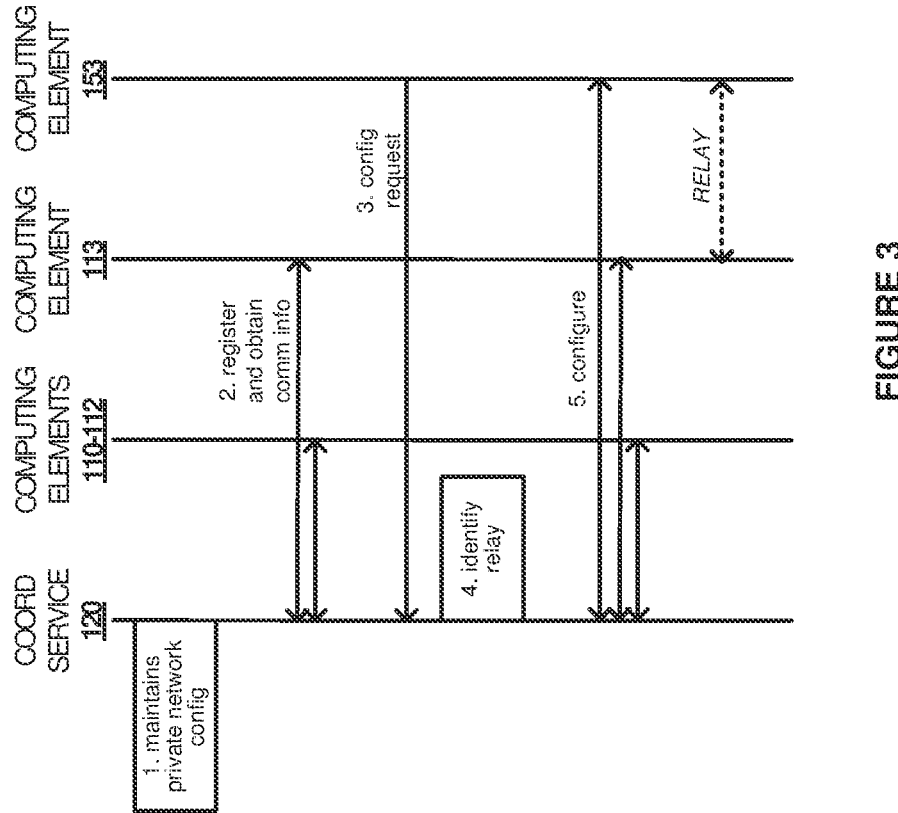
FIG. 3 illustrates a timing diagram for distributing communication information according to an implementation.
Figure 3:

FIG. 3 illustrates a timing diagram 300 for distributing communication information according to an implementation. Timing diagram 300 includes coordination service 120, and computing elements 110-113 and 153 from computing environment 100 of FIG. 1.

In timing diagram 300, coordination service 120 maintains a private network configuration at step 1, wherein the private network configuration may indicate user information or device information permitted to join a private network. The private network configuration may be configured by an administrator of the private network. As coordination service 120 maintains the private network configuration, computing elements 110-113 may register and obtain communication information for the private network at step 2. The registration may include providing device information, user information, or some other information to coordination service 120. Coordination service 120 may then distribute communication information that permits the computing systems to support the required communications of the private network. For example, communication information may include public IP information associated with other computing elements, public IP information associated with other computing elements, private IP address information associated with other computing elements allocated by coordination service 120, or some other communication information. When an application requires a communication in the private network, the application may use a private IP address associated with the destination for the communication. For example, computing element 110 may generate a communication with computing element 111 using a private IP address for computing element 111. In response to the request, a private networking service may encapsulate the packet using the public encryption key associated with computing element 111 and direct the packet to computing element 111 using a public IP address in the encapsulation header for the packet. Computing element 111 can then decapsulate the packet using the private encryption key and process the decrypted packet.

In addition to configuring computing element 110-113 for the private network, coordination service 120 receives a configuration request from computing element 153 at step 3. The request may provide information about the user, the computing element (i.e., software, hardware, and the like), or some other information. In response to the request, coordination service 120 may determine whether computing element 153 is permitted to join the private network and determine whether a relay is required for the communications of computing element 153. When a relay is required, coordination service 120 may select a relay from a set of available relays at step 4. The selection can be based on latency, throughput, or some other metric. In some examples, different relays may be available to a private network to facilitate the communications in the private network. Here, as also demonstrated in computing environment 100, computing element 113 is selected as the relay. Once selected, other computing elements in the computing environment are configured to permit the communications of computing element 153 at step 5.

In some implementations, computing element 113 maintains one or more data structures that can be used to associate a public IP address for computing element 153 and a public encryption key associated with computing element 153. The public encryption key can be advertised to computing element 113 via a connection with computing element 153. In some examples, the advertisement of the public encryption key can be signed by the private encryption key for computing element 153, such that computing element 113 can verify that computing element 153 is the owner of the advertised public key. When a packet is received, the public key for computing element 153 and any other computing element also communicating via relay computing element 113 is compared to a public key in the packet to determine the destination for the packet. For example, a packet received at computing element 113 may identify a public encryption key in the packet and compare the included public encryption key to a list of advertised encryption keys to determine a destination for the packet. In some examples, computing element 113 maintains a data structure that associates public encryption keys to destination IP addresses for the computing element. When the public key indicates that the destination is computing element 153, relay computing element 113 may perform an address translation to translate the destination address in the encapsulation header from an address associated with relay computing element 113 to a destination address associated with computing element 153. Once translated, the packet with the translated address is forwarded to the destination computing element. Although demonstrated as communicating a packet to computing element, computing element 153 may also transfer egress packets to computing element 113 (or in some examples other relays) and translation can be performed based on the encryption key used for the packet and included in the header. Advantageously, this permits computing element 153 to communicate with other computing elements, such as computing element 110.

Figure 4:
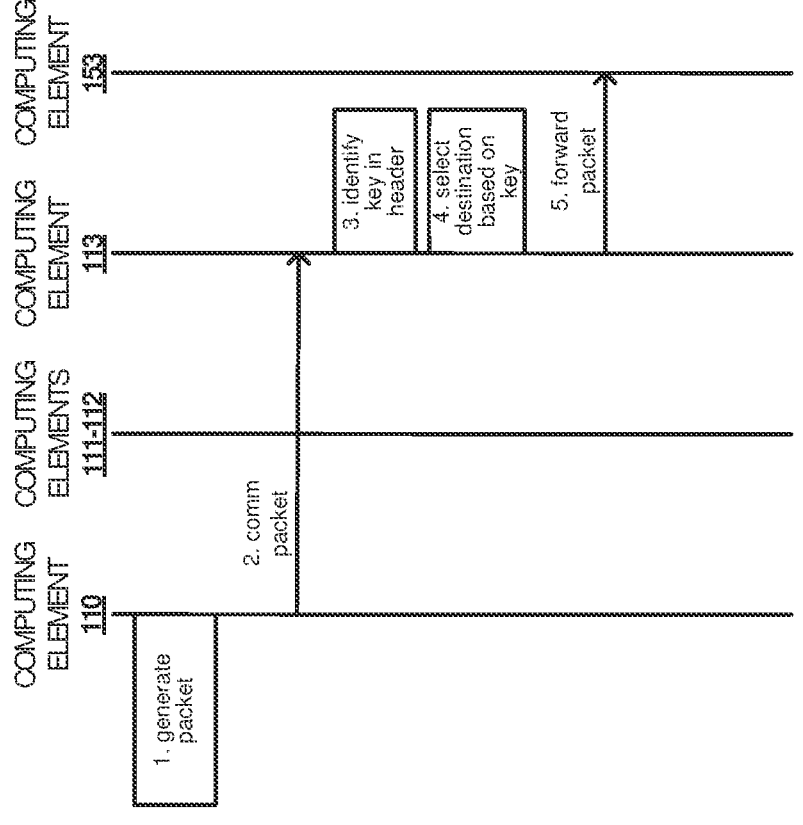
FIG. 4 illustrates a timing diagram for an encrypted communication according to an implementation.

FIG. 4 illustrates a timing diagram 400 for an encrypted communication according to an implementation. Timing diagram 400 includes computing elements 110-113 and computing element 153 from computing environment 100 of FIG. 1.

In timing diagram 400, computing element 110 generates a packet at step 1 that is forwarded to computing element 113 at step 2. In generating the packet, computing element 110 may use a private IP address associated with another computing element in a private network. For example, a private network may include five computing elements, wherein each computing element is allocated a unique private IP address by a coordination service. The coordination service may distribute, as part of communication information, the private IP addresses to each of the computing elements in the private network. The communication information may also include public IP addressing information for the computing elements, public encryption key information, or some other communication information. In some implementations, the communication information is distributed based on a configuration or access permissions provided by an administrator of the private network that can limit access to computing elements, services, ports, or some other limitation. Once a packet is generated with a private destination IP address (and a private source IP address), the packet is encapsulated using the public encryption key for the destination computing element and placing the public IP address for the destination computing element in the encapsulation header. The encapsulation header may also include a public source IP address, port information, or some other information. Here, the packet would be encapsulated using the public key associated with computing element 153 and the outer encapsulation header would include a public IP address for relay computing element 113, wherein relay computing element 113 may be used to relay communications to computing element 153. Additionally, the encapsulation header for the communication will include the public encryption key for computing element 153 to identify computing element 153 as the destination for the packet.

In response to receiving the communication, computing element 113 identify the public encryption key in the header and select a destination for the packet based on the public encryption key at steps 3 and 4. In some implementations, the public encryption key is compared to a list of public encryption keys that was advertised to computing element 113. The list of keys can be provided directly from the computing elements, wherein the keys can be signed using the private encryption key each available computing element to securely indicate or associate the proper destination (IP address) with the proper public encryption key. Once the destination computing element is selected, relay computing element 113 may perform address translation on the packet and forward the packet to the destination computing element 153.

Figure 5:
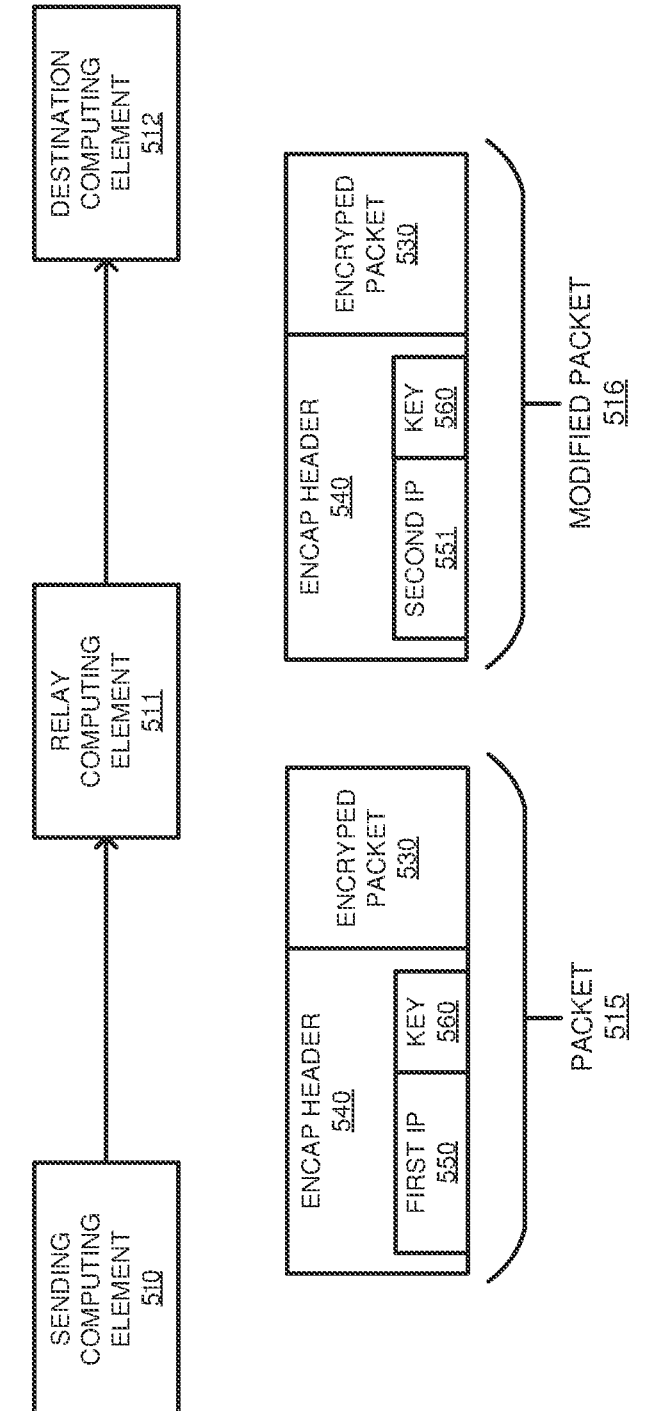
FIG. 5 illustrates an operational scenario of communicating a packet between computing elements according to an implementation.

FIG. 5 illustrates an operational scenario 500 of communicating a packet between computing elements according to an implementation. Operational scenario 500 includes sending computing element 510, relay computing element 511, and destination computing element 512. Operational scenario 500 further includes packets 515-516, wherein packet 515 includes encapsulation header 540, first IP address 550, public encryption key 560, and encrypted packet 530, and wherein modified packet includes second IP address 551 in place of first IP address 550.

In operational scenario 500, sending computing element 510 generates packet 515. The packet includes encapsulation header 540 with public encryption key 560 that corresponds to destination computing element 512, first IP address 550 that corresponds to a destination IP address for relay computing element 511, and encrypted packet 530. When an application on sending computing element 510 initiates a request to communicate with another computing element, a process on sending computing element 510 may identify a private destination address for the other computing element (allocated by a coordination service) and encapsulate the packet based on the private destination address. The encapsulation may include encrypting the packet using the public encryption key for the destination (distributed by the coordination service) and adding header information based on the private destination address.

Here, packet 515 includes first IP address 550 that corresponds to a public destination IP address for relay computing element 511 and public encryption key 560 for packets communicated to destination computing element 512. In some implementations, the communication information provided by the coordination service directs packets to relay computing elements that can, in turn, forward the packets to the desired destination. Advantageously, rather than providing each computing element with the IP addresses for possible destinations, the coordination service can provide a relay IP address that can forward packets to the required destinations.

Once the packet is communicated by sending computing element 510, relay computing element 511 receives the packet and determines a destination computing element for the packet based on public encryption key 560. In at least one implementation, relay computing element 511 receives advertised public encryption keys that each correspond to a different destination computing elements. The advertised encryption keys can be reported as part of the configuration from the coordination service or can be provided directly from the destination computing elements. In at least one implementation, the computing elements may advertise their corresponding public encryption key by signing the public encryption key with a private key. Relay computing element 511 can then verify the signature using the known public key for the computing element provided by the coordination service. Thus, the coordination service provides the public keys for computing elements in the network to the relay computing element, the relay computing element receives signed keys from the computing elements, and the relay computing element processes the signed keys using the keys from the coordination service to determine associations between public IP addresses for computing elements and their public encryption keys.

As an example, the coordination service may select a relay from a plurality of relays for destination computing element 512 and configure destination computing element 512 and sending computing element 510 to use relay computing element 511 for the communications. Destination computing element 512 may advertise, directly or indirectly, the public key for the encrypted communications to relay computing element 511. The public key for destination computing element 512 (and other computing elements that use relay computing element 511) can then be compared to public encryption key 560 included in packet 515 to determine a destination for the packet. After the destination is identified, relay computing element 511 may replace the destination IP address of the packet with second IP address 551, wherein second IP address 551 corresponds to destination computing element 512. Relay computing element 511 then communicates modified packet 516 to destination computing element 512. After receiving the packet, destination computing element 512 may apply a private key to decapsulate encrypted packet 530 and process the packet using the destination application.

Figure 6:
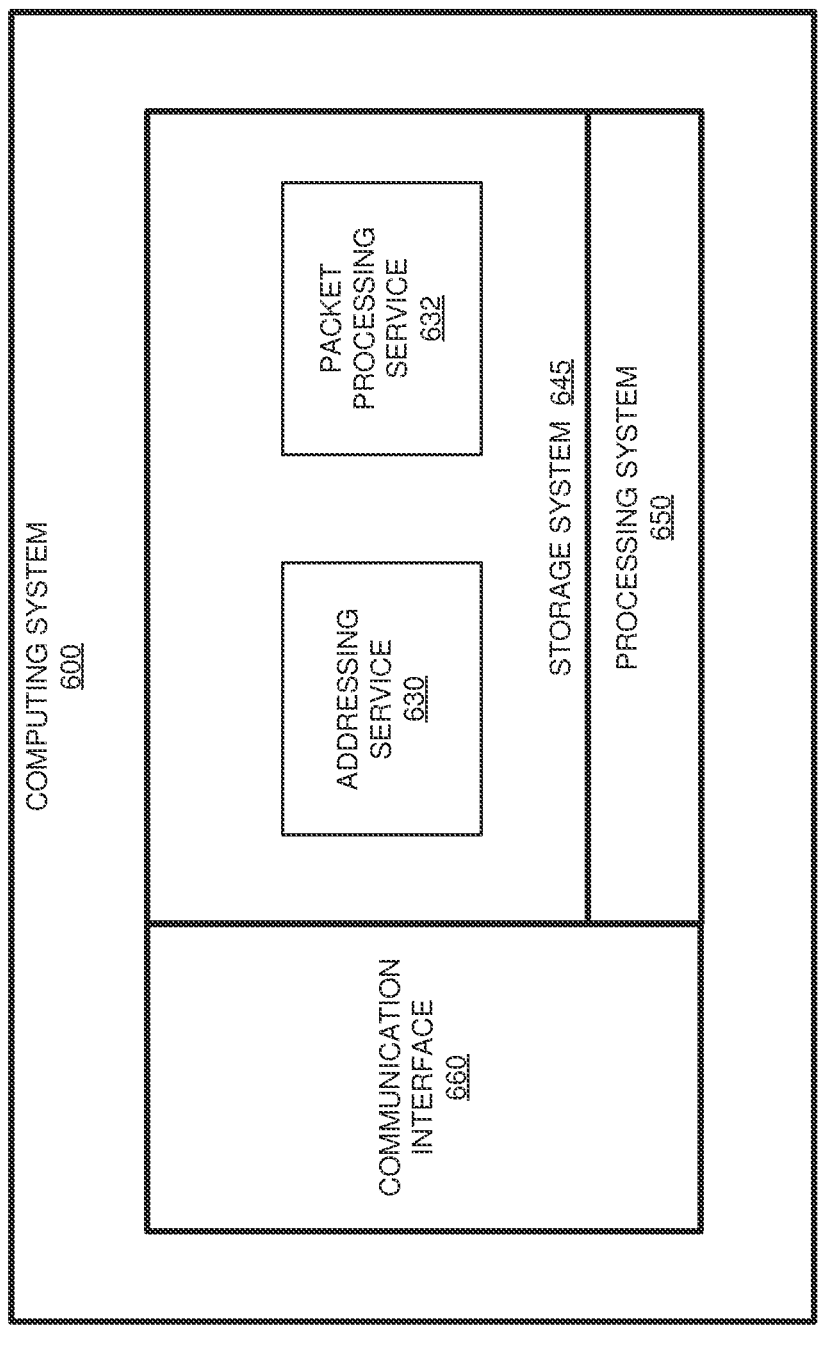
FIG. 6 illustrates a computing system to manage communications using encryption keys according to an implementation.

FIG. 6 illustrates a computing system 600 to manage communications using encryption keys according to an implementation. Computing system 600 is representative of any computing system or systems with which the various operational architectures, processes, scenarios, and sequences disclosed herein for a computing element can be implemented. Computing system 600 is an example computing element of private computing elements 110-113, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing systems and a coordination service to obtain a configuration for computing system 600.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises addressing service 630 and packet processing service 632 that provides at least operation 200 of FIG. 2. The operating software on storage system 645 may further include an operating system, utilities, drivers, network interfaces, applications, or some other type of software. When read and executed by processing system 650, the operating software on storage system 645 directs computing system 600 to operate as described herein.

In at least one implementation, addressing service 630 directs processing system 650 to maintain a data structure that associates public IP addresses with public encryption keys. The public encryption keys and IP address associations can be provided by a coordination service or can be provided by available destination computing elements in a private network. In one implementation, computing elements in a private network are configured to use a relay computing system to act as a relay for communications with other computing systems. The computing elements may each initiate a communication tunnel or path with computing system 600 and indicate the public key associated with the computing element. Addressing service 630 may direct processing system 650 to associate the public IP addresses for the computing elements with the corresponding encryption keys. In some examples, the public encryption keys are signed by the computing elements using the private keys for the computing elements and computing system 600 can use the public keys from the coordination service to verify the signatures. Once a signature is verified in association with a public key, the public key can be associated in the data structure with the public IP address that advertised the public key.

As the data structure is maintained, packet processing service 632 directs processing service 632 directs processing system 650 to identify an encrypted communication from a second computing system and identify a destination computing element from a plurality of destination computing elements based on a comparison of the public encryption key in the header of the communication. As described previously, the encryption keys advertised for the computing elements using computing system 600 can be compared to the public encryption key included in the com. Once a destination computing element is identified using the comparison, packet processing service 632 may perform a modification on the encapsulation header for the packet and forward the packet to the destination computing element. The modifications may include updating the destination IP address, the port information, or some other modification to support the destination computing element.

Figure 7:
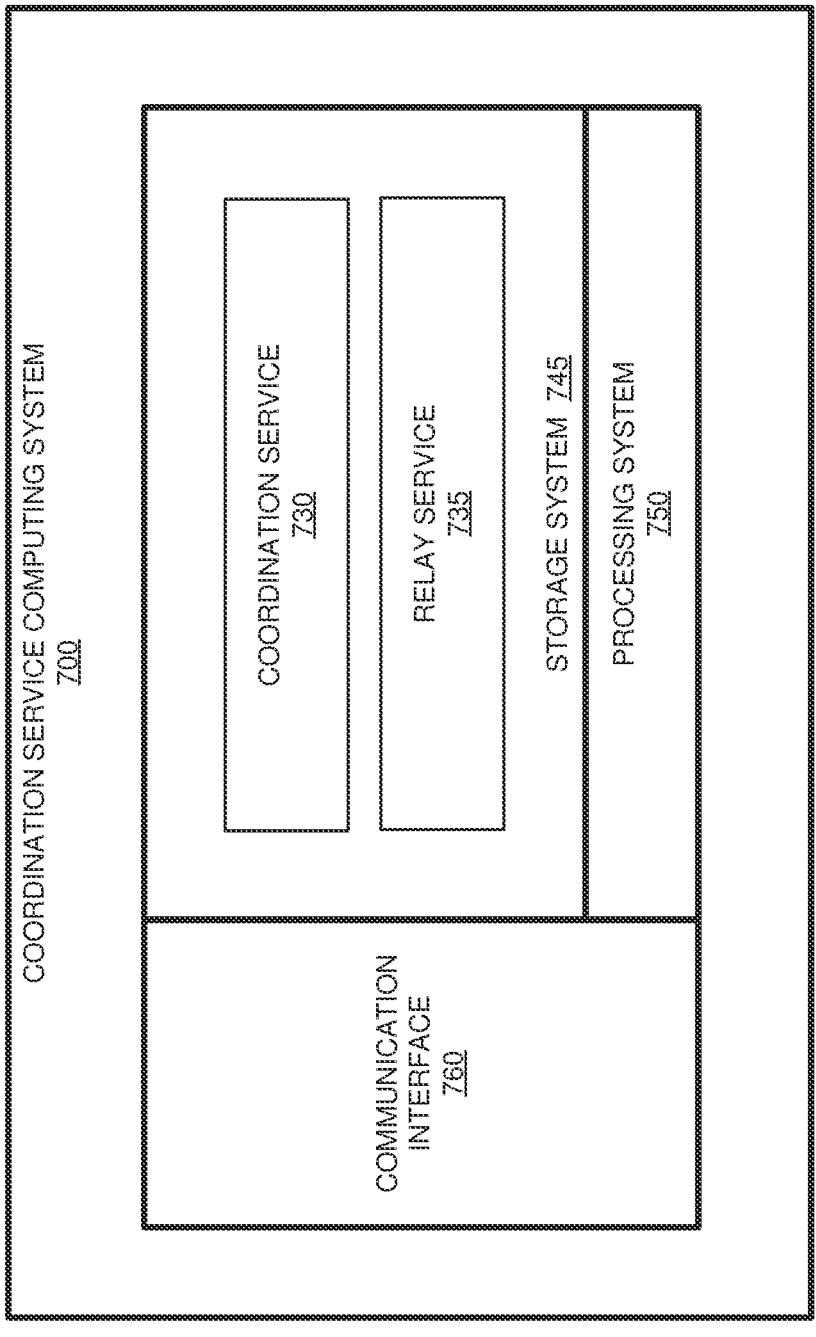
FIG. 7 illustrates a coordination service computing system to manage a private network according to an implementation.

FIG. 7 illustrates a coordination service computing system 700 to manage a private network according to an implementation. Computing system 700 is representative of any computing system or systems with which the various operational architectures, processes, scenarios, and sequences disclosed herein for a coordination service can be implemented. Computing system 700 is an example of coordination service 120 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with physical and/or virtual computing elements in one or more private networks. The computing elements include relay computing elements that can be used as an intermediary or relay for computing elements incapable of direct communication with other computing elements in the private network.

Processing system 750 comprises microprocessor and other circuitry that retrieves and executes operating software from storage system 745. Storage system 745 may include volatile and nonvolatile, removable, and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises coordination service 730 and relay service 735. The operating software on storage system 745 may further include an operating system, utilities, drivers, network interfaces, applications, or some other type of software. When read and executed by processing system 750, the operating software on storage system 745 directs computing system 700 to operate as described herein.

In at least one implementation, coordination service 730 may direct processing system 750 to register computing elements as part of a private network based on user information and/or device information. The configuration of coordination service 730 may be provided by an administrator that permits or blocks communications based on the user and/or device information. When a computing element attempts to join the private network, the computing element may provide information to computing system 700, permitting coordination service 730 to permit or block the computing element from joining the private network. When permitted, the communication information is distributed to the joining computing element as well as other computing elements in the private network to permit communications with the newly joined computing element. The communication information may include IP addressing information, encryption information, or some other information to support communications in the private network.

In some implementations, a computing element that attempts to join the network may require a relay. The relay can be used to limit access to the public IP addresses, provide workarounds for firewalls, or provide some other operation. In some examples, relay service 735 can direct processing system 750 to select a relay from a plurality of possible relays and configure the network to use the selected relay. The selection of the relay may be based on throughput, latency, firewall requirements, or some other factor. In some examples, coordination service 735 determines whether the registering computing element requires a relay based on networking characteristics for the computing element, requirements for the private network set by an administrator, or some other factor. Once the relay is selected, relay service 735 may distribute configuration information to computing elements in the computing environment. The configuration distributed may direct communications associated with the registering computing element through the selected relay, wherein the communications may include ingress and egress communications from the computing element.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
in a first computing element, identifying an encrypted communication destined for a destination computing element of a plurality of destination computing elements but addressed to the first computing element from a second computing element;
in the first computing element, identifying a public encryption key in a header of the encrypted communication;
in the first computing element, identifying, from a data structure, an address of the destination computing element corresponding to the public encryption key, wherein the data structure associates network addresses of the plurality of destination computing elements with different public encryption keys;
in the first computing element, replacing a first address in the encrypted communication with the address of the destination computing element, wherein the first address corresponds to the first computing element; and
in the first computing element, after replacing the first address with the address of the destination computing element, forwarding the encrypted communication to the destination computing element at the address of the destination computing element.

2. The method of claim 1 further comprising:
in the first computing element, establishing a secure tunnel with the destination computing element, wherein the destination computing element advertises the public encryption key over the secure tunnel.

3. The method of claim 1, further comprising:
in the first computing element, receiving the public encryption key from the destination computing element;
in the first computing element, storing the public encryption key associated with the address of the destination computing element in the data structure.

4. The method of claim 3 further comprising:
in the first computing element, receiving remaining keys of the different public encryption keys from one or more additional destination computing elements of the plurality of destination computing elements; and
in the first computing element, storing the remaining keys in the data structure with corresponding ones of the network addresses.

5. The method of claim 3, wherein receiving the public encryption key from the destination computing element comprises receiving the public encryption key as a signed encryption key from the destination computing element, wherein the public encryption key is signed using a private encryption key for the destination computing element.

6. The method of claim 1 further comprising:
in the destination computing element, decrypting the encrypted communication using a private encryption key.

7. The method of claim 1, wherein the destination computing element comprises a user computing device.

8. The method of claim 1, wherein the destination computing element comprises a virtual machine or a container.

9. The method of claim 1 further comprising:
in a coordination service, receiving a request for the destination computing element to join a private network; and
in the coordination service, selecting the first computing element to act as a relay for the destination computing element from a plurality of possible relay computing elements; and
in the coordination service, configuring at least the first computing element to act as the relay.

10. A computing apparatus comprising:
a storage system;
a processing system operatively coupled to the storage system; and
program instructions stored on the storage system that, when executed by the processing system, direct the computing apparatus to:
in a first computing element, identify an encrypted communication destined for a destination computing element of a plurality of destination computing elements but addressed to the first computing element from a second computing element;
in the first computing element, identifying a public encryption key in a header of the encrypted communication;
in the first computing element, identify, from a data structure, an address of a destination computing element corresponding to the public encryption key, wherein the data structure associates network addresses of a plurality of destination computing elements, including the destination computing element, with different public encryption keys;
in the first computing element, replace a first address in the encrypted communication with the address of the destination computing element, wherein the first address corresponds to the first computing element; and
in the first computing element, after the first address is replaced with the address of the destination computing element, forward the encrypted communication to the destination computing element at the address of the destination computing element.

11. The computing apparatus of claim 10, wherein the program instructions further direct the computing apparatus to:
in the first computing element, establish a secure tunnel with the destination computing element, wherein the destination computing element advertises the public encryption key over the secure tunnel.

12. The computing apparatus of claim 10, wherein the program instructions further direct the computing apparatus to:
in the first computing element, receive the public encryption key from the destination computing element;
in the first computing element, store the public encryption key associated with the address of the destination computing element in the data structure.

13. The computing apparatus of claim 12, wherein the program instructions further direct the computing apparatus to:
receive remaining keys of the different public encryption keys from one or more additional destination computing elements of the plurality of destination computing elements; and in the first computing element, store the remaining keys in the data structure with corresponding ones of the network addresses.

14. The computing apparatus of claim 12, wherein receiving the public encryption key from the destination computing element comprises receiving the public encryption key as a signed encryption key from the destination computing element, wherein the public encryption key is signed using a private encryption key for the destination computing element.

15. The computing apparatus of claim 10, wherein the destination computing element comprises a user computing device.

16. The computing apparatus of claim 10, wherein the destination computing element comprises a virtual machine or a container.

17. A system comprising:

a plurality of destination computing elements, including a destination computing element; and a relay computing element communicatively coupled to the plurality of destination computing elements, the relay computing element configured to:

identify an encrypted communication destined for the destination computing element but addressed to the relay computing element from a first computing element;

identify a public encryption key used to encrypt the encrypted communication;

identify a destination Internet Protocol (IP) address of the destination computing element corresponding to the public encryption key, wherein the relay computing element maintains associations between IP addresses of the plurality of destination computing elements and public encryption keys, including the public encryption key, used by respective ones of the plurality of destination computing elements to encrypt communications;

replace a first IP address in the encrypted communication with a destination IP address of the destination computing element, wherein the first IP address corresponds to the relay computing element; and after the first IP address is replaced with the destination IP address, forward the encrypted communication to the destination computing element at the destination IP address of the destination computing element.

18. The system of claim 17, wherein the relay computing element is further configured to:

establish a secure tunnel with the destination computing element, wherein the destination computing element advertises the public encryption key over the secure tunnel.

19. The system of claim 17, wherein the relay computing element is further configured to:

receive the public encryption keys from the plurality of destination computing elements; and store the associations in a data structure.

20. The system of claim 17, wherein the plurality of destination computing elements comprises physical computing systems or virtual machines.

* * * * *